United States Patent [19]

Gutleber

[11] 4,270,207
[45] May 26, 1981

[54] COMBINED ECCM/DIVERSITY TROPOSPHERIC TRANSMISSION SYSTEM

[75] Inventor: Frank S. Gutleber, Little Silver, N.J.

[73] Assignee: The United States of America as represented by the Secretary of the Army, Washington, D.C.

[21] Appl. No.: 64,161

[22] Filed: Aug. 6, 1979

[51] Int. Cl.³ .................. H03H 7/28; H04B 15/00; H04K 1/00
[52] U.S. Cl. ................................. 375/40; 328/155
[58] Field of Search ............... 375/40, 11, 1, 100; 328/155

[56] References Cited

U.S. PATENT DOCUMENTS

| | | |
|---|---|---|
| 3,461,451 | 8/1969 | Gutleber . |
| 3,519,746 | 7/1970 | Gutleber . |
| 3,634,765 | 1/1972 | Gutleber . |
| 3,715,665 | 2/1973 | Chang ................................. 328/155 |
| 3,775,685 | 11/1973 | Eggimann et al. .................... 375/11 |
| 3,881,154 | 4/1975 | Lewis et al. ........................... 375/10 |
| 3,909,720 | 9/1975 | Fantera ................................. 375/10 |
| 4,121,295 | 10/1978 | Witt ..................................... 375/11 |

*Primary Examiner*—Donald J. Yusko
*Attorney, Agent, or Firm*—Nathan Edelberg; Jeremiah G. Murray; Edward Goldberg

[57] ABSTRACT

A tropospheric transmission system employing perfect noise codes in providing M fold diversity with a single antenna, while simultaneously reducing jamming interference by a factor 2M. The noise codes employed are of the type termed code mates having correlation functions which upon detection provide an impulse autocorrelation function. The described arrangement utilizes n bit perfect noise mate pair codes, with coherent separation and extraction of the uncorrelated returns from the tropospheric medium followed by optimal combination in a maximal ratio combiner.

4 Claims, 6 Drawing Figures

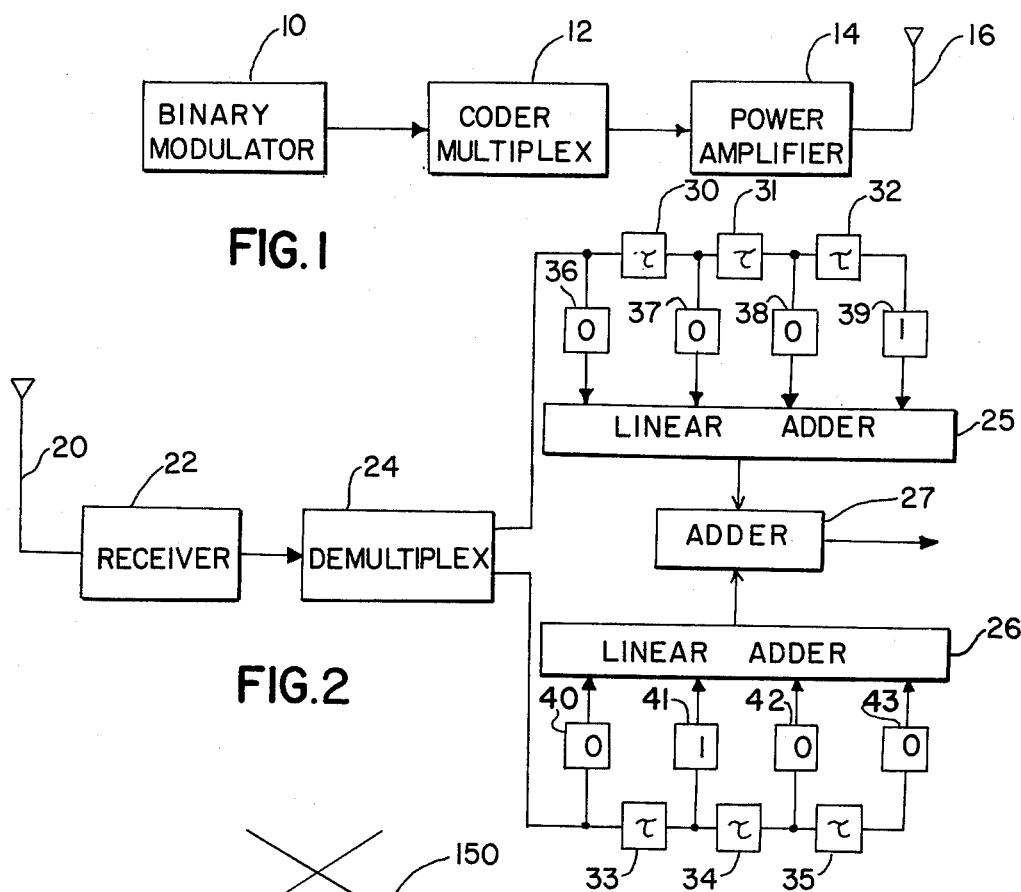
FIG.1
FIG.2
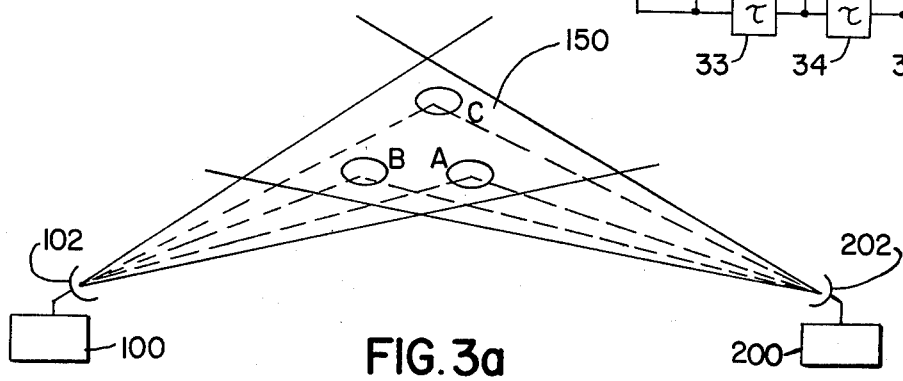
FIG.3a
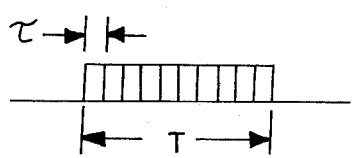
FIG.3b
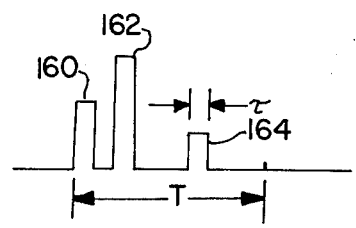
FIG.3c

COMBINED ECCM/DIVERSITY TROPOSPHERIC TRANSMISSION SYSTEM

The invention described herein may be manufactured and used by or for the Government for governmental purposes without the payment of any royalties thereon or therefor.

FIELD OF THE INVENTION

This invention relates to tropospheric transmissions systems and, more particularly, to such a system affording a diversity of 5-10, or greater, although with only a single antenna being used.

BACKGROUND OF THE INVENTION

As is well known and understood, one of the problems associated with tropospheric transmission systems is the large loss factor present, along with the accompanying signal distortion. In an attempt to obtain sufficient signal strengths to operate over ranges as much as 100 miles, and more, a form of space diversity using multiple antennas is most commonly used. However, and as is also widely known, usually not more than two or three antennas are ever employed, because of their relatively large size and rather expensive costs for use in such transmissons. Attempts at using frequency diversity have proven not to be too successful, generally, partly due to the characteristics of the tropospheric medium, in causing not-infrequent outages due to signal fades and because of the arrangements utilized in combining together the several time-delayed signal receptions. These factors make the tropospheric transmission system particularly vulnerable in a high jamming interference environment.

SUMMARY OF THE INVENTION

As will become clear hereinafter, the tropospheric transmission system of the present invention employs perfect multiplexed noise codes to provide protection against jamming while simultaneously providing an M fold diversity with an optimum maximal ratio combiner. Because the noise codes compress lobelessly, no cancellation of signal energy generally results in the cmposite multipath return, thereby improving diversity performance over prior arrangements as substantially all of the available signal energy is recovered for detection purposes. The use of the noise code (or spread spectrum) structure, furthermore, automatically provides an anti-jamming protection by a degree which will be seen equal to the quantity of noise code bits in each signal transmisson. Because the spread spectrum noise code is located within the multipath spread time, optimum coherent pulse compression can be utilized, to effectively provide an M fold diversity from but a single antenna.

BRIEF DESCRIPTION OF THE DRAWINGS

These and other features of the present invention will be more readily understood from a consideration of the following description taken in connection with the accompanying drawings in which:

FIG. 1 is a functional block diagram of the transmitting portion of a communications system employing multiplexed coding;

FIG. 2 is a functional block diagram of the receiving portion of such a communications system for use with a multiplexed code constructed according to the invention;

FIG. 3a-3c is a simplified illustration of a tropospheric transmission system and its associated information bits utilizing perfect noise codes.

DETAILED DESCRIPTION OF THE DRAWINGS

Figure 4:
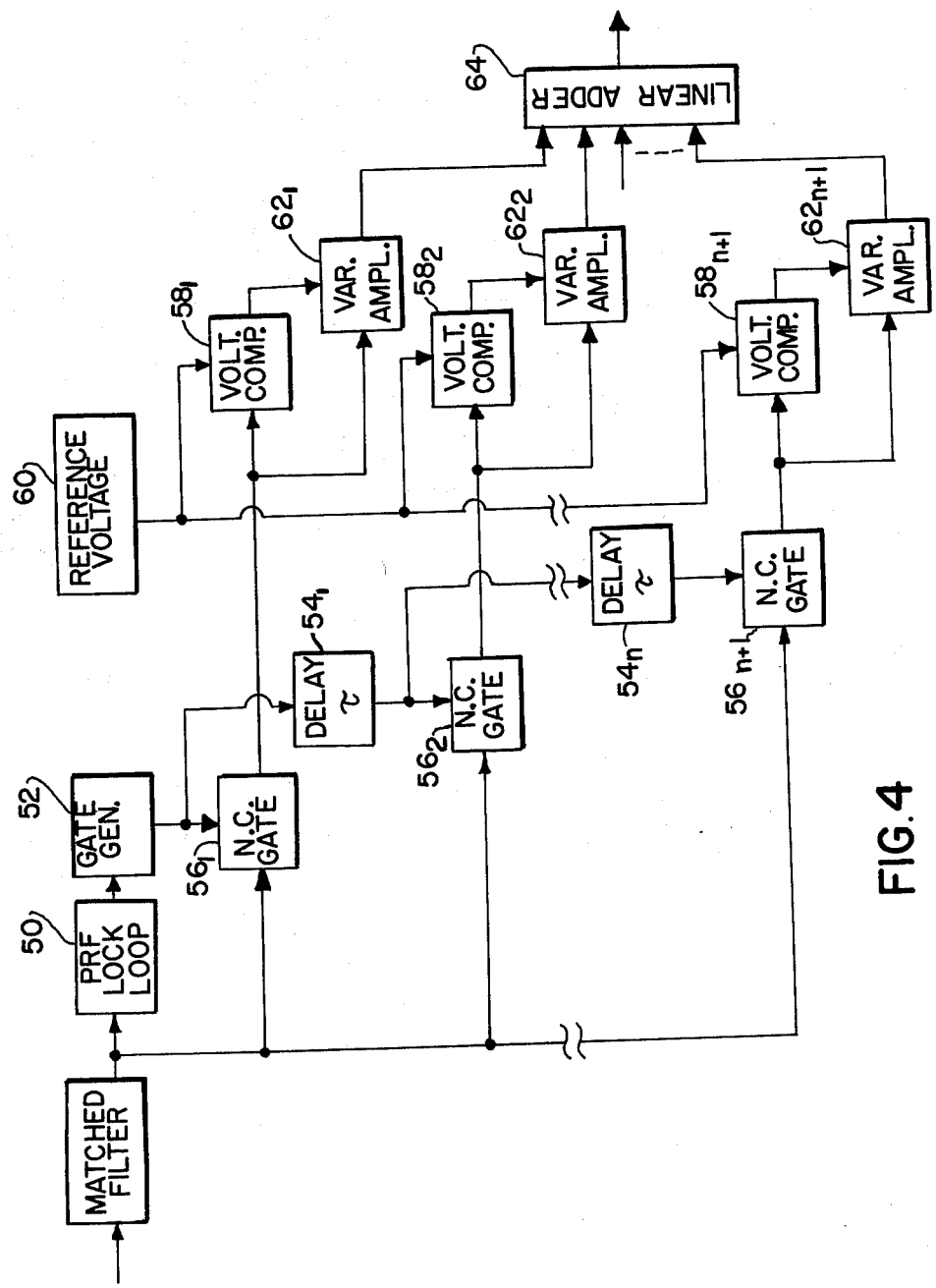
FIG. 4 is a functional block diagram of the diversity receiver part of the transmission system constructed in accordance with the invention.

As is described in my issued U.S. Pat. Nos. 3,461.451, 3,519,746 and 3,634,765, for example, a number of classes of codes (i.e. pairs of code signals termed code mates) have amplitude and autocorrelation functions which provide a peak output at a given time and a zero output (or outputs having the same magnitude but opposite polarity) at all other times. When the code mates are detected and the resultant detected outputs are linearly added, there is provided an impulse output of high amplitude at one given time and a zero output at all other times.

To utilize multiplexed coding in the tropospheric transmission system of the present invention, a simplified transmission system might be established (as shown in FIG. 1) in which a binary modulator 10, a coder-multiplexer 12, a power amplifier 14 and an antenna 16 are included. These units may be located at either station of a tropospheric transmission link, with the modulator 10 and coder-multiplexer 12 comprising clock, synchronizing generator, code generator and mixing apparatus to provide propagation by the antenna 16. As will become clear from the discussion that follows, the coder-multiplexer 12 is designed such that code mate pairs are transmitted which compress to a single impulse, lobelessly. FIG. 2 symbolically shows a receiver arrangement for the multiplexer coding of the tropospheric transmission system, for use in an illustrative manner with mate code pairs which meet the autocorrelation requirements and in which:

Code(a) = 1000

Code(b) = 0010 where:
 0 indicates a plus (+)
 1 indicates a minus (−)

The arrangement will be seen to incorporate an antenna 20, coupled to a receiver 22, the output of which is applied to a de-multiplexer 24. The remaining elements essentially comprise a matched filter configuration, with the construction being physically located at the ends of the transmission link.

Referring more particularly to the construction of FIG. 2, it will be seen that a pair of linear adders 25, 26 are included, with the outputs of each being applied to a further adder 27, which provides the output signal. The input signals to the adders 25, 26, on the other hand, are provided, after demultiplexing, by means of a plurality of time delay circuits and by means of a plurality of phase control circuits. Specifically, the circuits 30, 31, 32, 33, 34, 35 each delay the detected code signal by one time slot of the synchronous timing cycle. The phase control circuits 36, 37, 38, 39, 40, 41, 42, 43 are of construction to provide a signal feedthrough either with 0° or 180° phase shift depending upon the specific code mate operated upon. In FIG. 2. the circuits identified by the reference numerals 36, 37, 38, 40, 42, and 43 provide zero phase reversal for the code signal, whereas the circuits 39 and 41 provides the 180° phase reversal required. In the description that is shown, it will be understood that the inclusion of a "0" within these phase control circuits represents a signal feedthrough with zero phase alteration while the inclusion of a "1" indicates a phase reversal of 180°.

The compression of the code 1000 in the top portion of the matched filter of FIG. 2 is illustrated as follows, with the last line indicating the autocorrelation function from the added 25.

| Time Slot | 1 | 2 | 3 | 4 | 5 | 6 | 7 |
|---|---|---|---|---|---|---|---|
| Pulse | 0 | | 1 | 0 | 0 | 0 | |
| Comp. | 0 | | | 1 | 0 | 0 | 0 |
| Filter | 0 | | | | 1 | 0 | 0 | 0 |
| | 1 | | | | | 0 | 1 | 1 |
| $\phi a\,(\tau)$ Filter Output | 1 | . | 0 | $0^4$ | 0 | . | 1 |

(In the foregoing table, it will be appreciated that the exponent indicates the amplitude.)

The compression of the code 0010 in the bottom portion of the matched filter of FIG. 2 is illustrated by the following table, where the last line indicates the autocorrelation function from the adder 26.

| Time Slot | 1 | 2 | 3 | 4 | 5 | 6 | 7 |
|---|---|---|---|---|---|---|---|
| Pulse | 0 | 0 | 0 | 1 | 0 | | |
| Comp. | 1 | | 1 | 1 | 0 | 1 | |
| Filter | 0 | | | 0 | 0 | 1 | 0 |
| | 0 | | | | 0 | 0 | 1 | 0 |
| $\phi b\,(\tau)$ Filter Output | 0 | . | 1 | $0^4$ | 1 | . | 0 |

The following table—, and, specifically, the last line therein—illustrates the output signal of the added 27, showing that the linear sum of the orthogonally multiplexed filter outputs results in a compression of the composite code to a single impulse.

| Time Slot | 1 | 2 | 3 | 4 | 5 | 6 | 7 |
|---|---|---|---|---|---|---|---|
| | 1 | . | 0 | $0^4$ | 0 | . | 1 |
| | 0 | . | 1 | $0^4$ | 1 | . | 0 |
| $\Sigma$ | . | . | . | $0^8$ | . | . | . |

The arrangement of FIG. 3b pictorially illustrates bit noise code for transmission along a tropospheric link as shown in FIG. 3a. Transmissions between stations 100 and 200 are accomplished by means of their associated antennas 102, 202 with signal scattering and various delays being effected along the components A, B, C of the troposhperic medium 150. Compressed multipath information bit returns of the type shown by reference numerals 160, 162 and 164 of FIG. 3c are received from the tropospheric regions A, B and C. Whereas the illustrations of FIG. 3a and 3c indicate how the separate uncorrelated returns for an n bit noise code would compress lobelessly in a tropospheric medium, in general, some signal is present in all the multipath time slots contained within the overlapped region of the antenna beam patterns. However, for purposes of explanation describing the principles of the invention, only three returns will be considered.

Thus, in applying the example 4 bit code pairs in the tropospheric transmission system of the present invention, it will be assumed that the multipath region may be divided into four uncorrelated time slots. The amplitudes of the three multipath returns will be assumed to be 2, 3 and 1, and they will be further assumed to arrive at the receiver in the time slots illustrated below. As will be understood, the amplitude in the first multipath return will be two times the amplitude of the third multipath return, and the amplitude of the second multipath return will be seen to be three times that of the third return.

The following table illustrates both the multiplexed code signals that would be received during these three multipath returns, as well as the linear sum of the coded signals as would appear at the multiple access inputs of the receiving units. The code (a) inputs are:

| Time Slot | −3 | −2 | −1 | +1 | +2 | +3 | +4 |
|---|---|---|---|---|---|---|---|
| Multipath Return #1 | $1^2$ | $0^2$ | $0^2$ | $0^2$ | | | |
| Multipath Return #2 | | $1^3$ | $0^3$ | $0^3$ | $0^3$ | | |
| Multipath Return #3 | | | | 1 | 0 | 0 | 0 |
| (a) | $1^2$ | 1 | $0^5$ | $0^4$ | $0^4$ | 0 | 0 |

In a similar manner the composite signal for code (b) is as follows:

| Time Slot | −3 | −2 | −1 | +1 | +2 | +3 | +4 |
|---|---|---|---|---|---|---|---|
| Multipath Return #1 | $0^2$ | $0^2$ | $1^2$ | $0^2$ | | | |
| Multipath Return #2 | | $0^3$ | $0^3$ | $1^3$ | $0^3$ | | |
| Multipath Return #3 | | | | 0 | 0 | 1 | 0 |
| $\Sigma(b)$ | $0^2$ | $0^5$ | 0 | . | $0^4$ | 1 | 0 |

The only difference between the foregoing two tables will be seen to be that the first represents the condition for the code (a) inputs while the second represents that for the code (b) inputs.

Pulse compressing the composite outputs in their respective matched filters and linearly adding them produces the following. Pulse compressing the code (a) composite output:

| Time Slot | −3 | −2 | −1 | +1 | +2 | +3 | +4 | +5 | +6 | +7 |
|---|---|---|---|---|---|---|---|---|---|---|
| PUlse 0 | $1^2$ | 1 | $0^5$ | $0^4$ | $0^4$ | 0 | 0 | | | |
| Comp. 0 | | $1^2$ | 1 | $0^5$ | $0^4$ | $0^4$ | 0 | 0 | | |
| Filter 0 | | | $1^2$ | 1 | $0^5$ | $0^4$ | $0^4$ | 0 | 0 | |
| 1 | | | | $0^2$ | 0 | $1^5$ | $1^4$ | $1^4$ | 1 | 1 |
| $\Sigma \phi a(\tau)$ Filter Output | $1^2$ | $1^3$ | $0^2$ | $0^{10}$ | $0^{14}$ | $0^4$ | $0^4$ | $1^2$ | . | 1 |

Pulse compressing the composite output for code (b) results in:

| Time Slot | −3 | −2 | −1 | +1 | +2 | +3 | +4 | +5 | +6 | +7 |
|---|---|---|---|---|---|---|---|---|---|---|
| Pulse 0 | $0^2$ | $0^5$ | 0 | . | $0^4$ | 1 | 0 | | | |
| Comp. 1 | | $1^2$ | $1^5$ | 1 | . | $1^4$ | 0 | 1 | | |
| Filter 0 | | | $0^2$ | $0^5$ | 0 | . | $0^4$ | 1 | 0 | |

-continued

| Time Slot | −3 | −2 | −1 | +1 | +2 | +3 | +4 | +5 | +6 | +7 |
|---|---|---|---|---|---|---|---|---|---|---|
| 0 | | | | $0^2$ | $0^5$ | 0 | | $0^4$ | 1 | 0 |
| $\Sigma\phi b(\tau)$ Filter Output | $0^2$ | $0^3$ | $1^2$ | $0^6$ | $0^{10}$ | $1^4$ | $0^6$ | $0^2$ | | 0 |

The linear sum of the two matched filter outputs then yields:

| Time Slot | −3 | −2 | −1 | +1 | +2 | +3 | +4 | +5 | +6 | +7 |
|---|---|---|---|---|---|---|---|---|---|---|
| $\Sigma\phi a(\tau)$ | $1^2$ | $1^3$ | $0^2$ | $0^{10}$ | $0^{14}$ | $0^4$ | $0^2$ | $1^2$ | | 1 |
| $\Sigma\phi b(\tau)$ | $0^2$ | $0^3$ | $1^2$ | $0^6$ | $0^{10}$ | $1^4$ | $0^6$ | $0^2$ | | 0 |
| $\Sigma\phi T(\tau)$ | | | | $0^{16}$ | $0^{24}$ | | $0^8$ | | | |

The two major factors to note from this last table are that the compressed uncorrelated multipath return bits are totally non-interfering and the amplitude of each individual received signal is eight times greater than its respective level at the input to the matched filter. This factor of eight is simply the time-bandwidth product or, equivalently, the number of noise code bits contained in the transmitted information bit. This increase of eight times in the signal amplitude provides the advantageous result of increasing the signal-to-noise power ratio by that same factor, as well as the signal-to-jamming power ratio in a hostile environment. In usage, the specific, selected time slots are simply gated out prior to the modulation of the information to provide an output that is totally non-interfered with and which simultaneously provides a protection against jammers equal to the number of accesses with no required increase in bandwidth. If a 100 bit noise code were employed, it will be appreciated that the interference power of a jammer would be reduced by 20 db for each multipath return—simultaneously, the output signal-to-noise power ratio would be enhanced by 20 db for each multipath return with no loss of signal energy due to out of phase cancellation of different returns of the multipath signals.

Reference was previously made to my U.S. Pat. Nos. 3,461,451, 3,519,746 and 3,634,765 in discussing the concept of perfect noise codes. Also described therein are methods and apparatus for generating and compressing these codes in a lobeless manner. On the other hand, the functional block diagram of FIG. 4 herein illustrates a type of diversity receiver which forms part of the tropospheric transmission system of the invention. In operating this diversity receiver system, the signal combining used will be seen to be one of maximal ratio combining, in accordance with which the amplitudes of the various diversity channel signals are adjusted in proportion to their signal-to-noise ratio, so as to optimize and maximize such characteristic. As will be understood, the input to the diversity receiver system of FIG. 4 is the summed output of the matched filter for each code mate pair.

As indicated, the matched filter output is coupled to a narrowband pulse repetition frequency (PRF) lock loop 50 so as to synchronize to the information bit stream. The output of such stream is then applied to a gate generator 52 for providing a signal of a pulse width equal to the width of the individual noise code bits (as shown in FIG. 2). Such gating control signal is then progressively delayed by increments of bit width $\tau$ in delay circuits $54_1, 54_2, \ldots 54_n$, and used to separately gate out or orthogonally extract the uncorrelated multipath returns. A plurality of "normally-closed" gates $56_1, 56_2, \ldots 56_{n+1}$ are employed, each of which receive the matched filter output at one of its two input terminals, to the other of which the gate signal is applied.

A plurality of voltage comparators and adjustable amplitude control circuits are further included, equal in number to the number of "normally-closed" gates employed. Each voltage comparator $58_1, 58_2, \ldots 58_{n+1}$ receives as an input signal a reference voltage from a supply source 60 and the information signal coupled through its associated gate $56_1, 56_2, \ldots 56_{n+1}$. As illustrated, the output of these comparators serve as one input to the adjustment amplitude apparatus $62_1, 62_2 \ldots 62_{n+1}$, along with the gated through signal, for amplitude adjustment and for coupling as one of the n+1 inputs to a linear adder 64.

In operation, the diversity receiver of FIG. 4 is such as to provide a quantity of individual gated bit streams to ideally correspond to the quantity of uncorrelated time slots contained in the composite multipath return signal. In a practical system, on the other hand, the quantity would be equal to the maximum multipath spread divided by the noise code bit width.) Each gated stream then comprises an independent multipath return, which is readily compared to the illustrated reference voltage and adjusted in amplitude to provide a maximal-ratio (optimum) combiner when all of the amplitude adjusted returns are linearly added. As will be readily appreciated by those skilled in the art, this is acheived when the relative amplitudes are adjusted to a level that is proportional to the strength of the individual signals, while at the same time, is equivalent to providing a filter that is adaptively matched to the composite amplitude varying (time variant) input.

As will be understood by those skilled in the art, the use of a wide pulse in the transmissions maximizes the energy received for greater signal-to-noise ratio and anti-jamming protection. Because perfect noise codes are employed, the pulse transmissions received compress lobelessly, producing as a result, a series of individual pulse energies which can be applied to a maximal ratio combiner in direct proportion to the amplitudes for coherent combining and adding. Because of the noise codes, substantially no cancellation of the signal structure exists such that with an n bit noise code, n fold diversity is realizable in the limit. This represents a significant advantage over prior systems using space diversity (with its costly multiplicity of antennas) or using frequency diversity (with the limitations on bandwidth available for use). Not only will the use of perfect noise codes permit a diversity equal to the number of bits M in each mate code, but for each such code pair, a resultant increase of 2 M of anti-jamming advantage follows—and, at no additional cost. The end result of the combination of increased diversity and increased anti-jamming capability makes the present invention particularly attractive in electronic counter-countermeasure situations.

While there has been described what is considered to be a preferred embodiment of the present invention, it will be appreciated by those skilled in the art that modifications may be made without departing from the scope of the teachings herein of employing perfect noise codes which compress lobelessly so as to permit uncorrelated multipath returns to be orthogonally gated out without cancellation of the received signal energy, in an environment utilizing an optimum maximal ratio combiner for a tropospheric transmission system. Although one such code mate pair has been described, it will be evident that other codes having spread spectrum structures could alternatively be employed to provide an M fold diversity of the extent desired. For at least such reason, therefore, resort should be had to the claims appended hereto for a correct understanding of the scope of the invention.

I claim:

1. A signal communications system of the type utilizing the troposphere as the communication medium, and provided with receiver and transmitter apparatus in which said transmitter apparatus comprises:
   means for generating a pair of coded message information signals;
   means for generating a timing reference signal; and
   means for multiplexing said message information signals with said timing reference signal for communication of said message information at selected time intervals within a predetermined transmission period; said coded signal generating means generating a pair of coded signals which upon receipt and detection by a receiver apparatus in communication with said transmitter apparatus produces an output signal having an impulse autocorrelation function during its selected time interval in said predetermined transmisson period; and said receiver apparatus comprises:
   a receiver coupled to said transmitter, a demultiplexer coupled to said receiver, and a matched filter autocorrelation detector coupled to said demultiplexer to provide said output signal, said matched filter autocorrelation detector including a pair of adder circuits, a plurality of time delay circuits for successively delaying the application of received coded pulses to input terminals of said adders by one interval of time each, a plurality of phase control circuits for reversing the polarities of selected code pulses applied at said input terminals in accordance with the predetermined code patterns of said coded pulses, a common adder circuit connected to said pair of adder circuits to provide an output signal, and a diversity receiver maximal ratio combiner coupled to said output signal of said matched filter autocorrelation detector for extracting signal returns from the tropospheric medium at increased signal-to-noise power ratio, said diversity receiver including a narrowband pulse repetition frequency lock loop for synchronizing to the transmitted information bit, a gate generator connected to said lock loop for providing a gating signal of pulse width equal to the width of the individual noise code bits, delay means for progressively delaying said gating signal by increments of bit width and extracting uncorrelated multipath returns, a plurality of normally closed gates receiving said matched filter output signal and said gating signal, a plurality of voltage comparators and adjustable amplitude control circuits connected with the output of respective noramlly closed gates, the output of said voltage comparators being connected as a further input to said amplitude control circuits, a source of reference voltage connected to said voltage comparators, and a linear adder circuits coupled to the outputs of said amplitude control circuits to provide a combined output proportional to the strength of the individually adjusted signals from said amplitude control circuits.

2. The signal communications system of claim 1 wherein said coded signal generating means generates first and second sequences of coded pulses, the pulses of which have predetermined code patterns, different one from another, but related thereto in that upon receipt and detection, the autocorrelation function of each code will be of substantially equal magnitude and opposite polarity for all intervals of time other than during said selected time interval in said predetermined transmisson period.

3. The signal communications system of claim 2 wherein said coded signal generating means includes a plurality of code generators, one for each of said pair of coded signals, wherein said timing reference signal generating means includes a synchronizing signal generator, wherein said multiplexing means includes a multiplexer coupled to said code and synchronizing signal generators, and a transmitter coupled to said multiplexer.

4. The signal communication system of claim 1 wherein sequential ones of said phase control circuits provide a phase reversal of 0° or 180° in inverse relationship to the sequence of coded pulses provided by said coded signal generating means.

* * * * *